(12) United States Patent
Larsen

(10) Patent No.: US 7,305,443 B2
(45) Date of Patent: Dec. 4, 2007

(54) SYSTEM AND METHOD FOR TAILORING OF ELECTRONIC MESSAGES

(75) Inventor: Per Buch Larsen, Brondby (DK)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 10/185,835

(22) Filed: Jun. 27, 2002

(65) Prior Publication Data

US 2003/0041113 A1    Feb. 27, 2003

(30) Foreign Application Priority Data

Jul. 10, 2001    (GB)    ................. 0116771.7

(51) Int. Cl.
*G06F 15/16* (2006.01)
(52) U.S. Cl. .................................... 709/206
(58) Field of Classification Search ............... 709/206, 709/203
See application file for complete search history.

(56) References Cited

U.S. PATENT DOCUMENTS

| 5,619,648 | A | 4/1997 | Canale et al. |
| 5,819,269 | A | 10/1998 | Uomini |
| 5,884,033 | A | 3/1999 | Duvall et al. |
| 5,930,479 | A * | 7/1999 | Hall ........................... 709/206 |
| 5,999,932 | A | 12/1999 | Paul |
| 6,154,757 | A * | 11/2000 | Krause et al. ............... 715/530 |
| 6,192,396 | B1 * | 2/2001 | Kohler ........................ 709/206 |
| 6,529,942 | B1 * | 3/2003 | Gilbert ........................ 709/206 |
| 6,563,913 | B1 * | 5/2003 | Kaghazian ................... 709/206 |
| 6,654,789 | B1 * | 11/2003 | Bliss et al. ................... 709/206 |
| 6,826,551 | B1 * | 11/2004 | Clary et al. .................. 709/206 |
| 6,829,631 | B1 * | 12/2004 | Forman et al. .............. 709/202 |
| 2001/0051987 | A1 * | 12/2001 | Fukumoto et al. .......... 709/206 |
| 2002/0194280 | A1 * | 12/2002 | Altavilla et al. ............. 709/206 |

* cited by examiner

*Primary Examiner*—Phuoc H. Nguyen
(74) *Attorney, Agent, or Firm*—Scully, Scott, Murphy & Presser, P.C.; David L. Adour, Esq.

(57) ABSTRACT

A system and method for tailoring of electronic messages by combining in a composite electronic message information with an indication that at least one portion thereof is targeted for at least one predetermined class of recipient; performing a comparison of the indication contained in a received composite message with a predetermined indication of whether a recipient is of a class intended to receive the indicated portion; and passing the indicated portion to the recipient in dependence on the comparison.

5 Claims, 7 Drawing Sheets

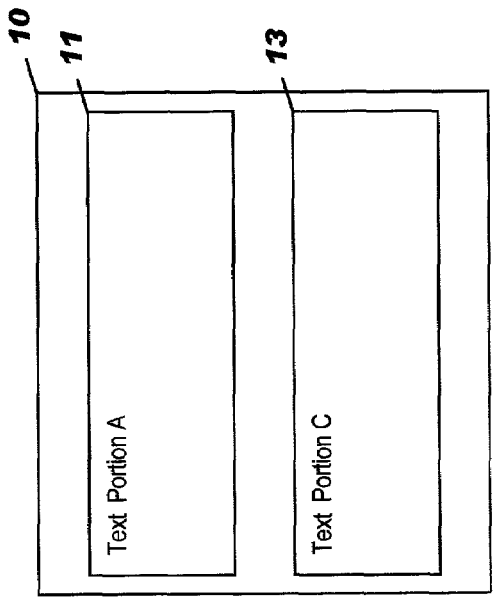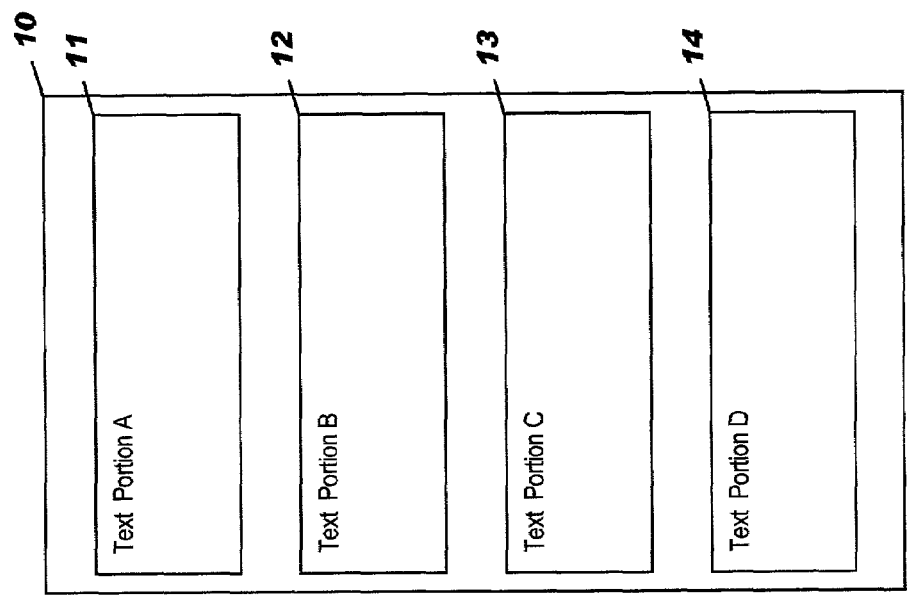

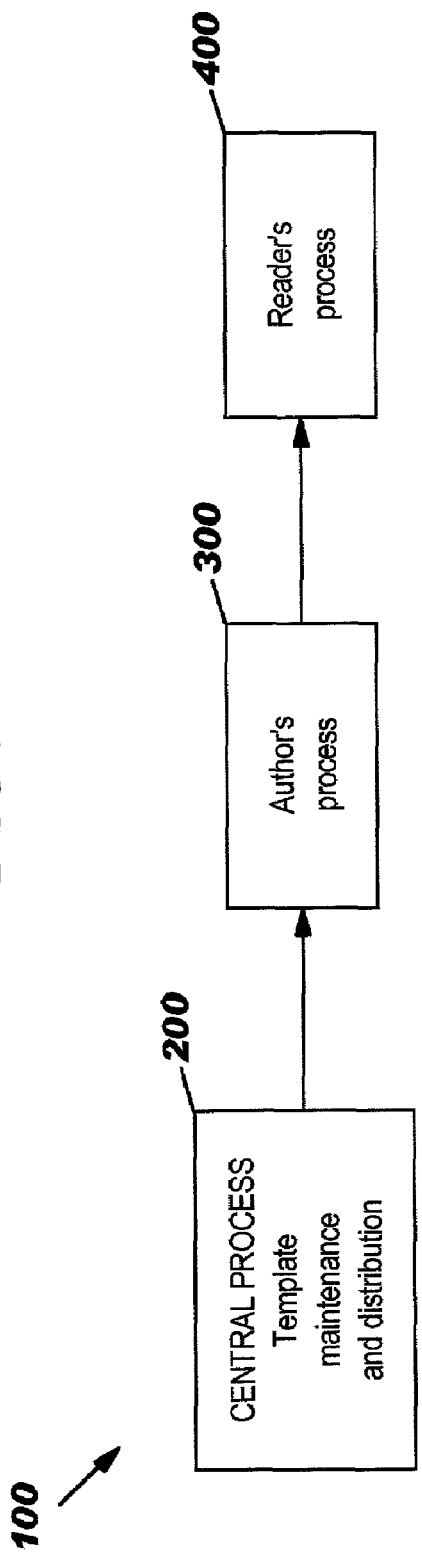

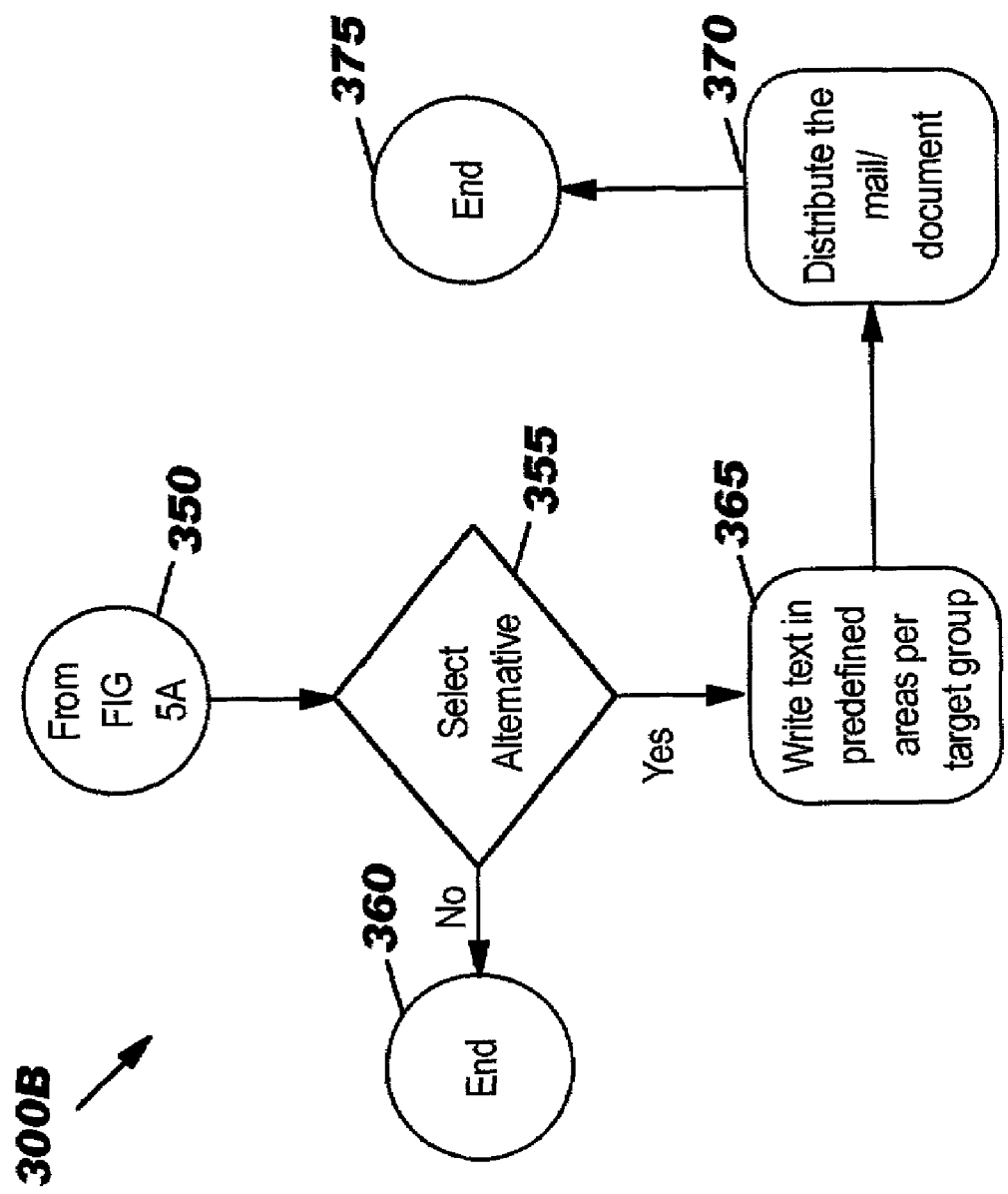

SYSTEM AND METHOD FOR TAILORING OF ELECTRONIC MESSAGES

FIELD OF THE INVENTION

The present invention relates to electronic messaging, and particularly to e-mail and newsletters.

BACKGROUND OF THE INVENTION

In the field of this invention it is known that electronic messages such as e-mail and newsletters, because of their ease of use (and particularly the ease which they may be addressed to multiple addressees) are sent in wide proliferation and often indiscriminately.

Consequently, electronic message recipients may receive a lot of redundant information in electronic newsletters and e-mail. Recipients today spend much time on reading mails where a major or minor part is without any relevance to them and their job role. Also, if an author wants to distribute e-mail or newsletters to specific target groups the author is often forced to produce various versions of a message—one to each target group—to be able to show respectively only the information that might be of interest to each specific target group.

U.S. Pat. No. 5,819,269 describes a dynamic sorting of (for example) newsgroup postings received by a client based on categories of posting. However, this known sorting allows only for any individual message to be blocked or allowed in its entirety.

Similarly, U.S. Pat. No. 5,619,648 describes filtering of (for example) e-mail at a client to remove junk mail; U.S. Pat. No. 5,999,932 describes a solution where an e-mail as a whole is marked with a kind of status code for filtering; and U.S. Pat. No. 5,884,033 describes filtering Internet material such as e-mail. However, again, in all of these known descriptions filtering is achieved only by blocking or allowing an individual e-mail as a whole.

Clearly, there is a need for a recipient to be able to receive only that part or those parts of an electronic message having relevance to the recipient. Similarly there is a need for an author to be able to produce a reduced number of different versions of a message, where the message is to be sent to different recipients who may be interested in different parts of the message.

A need therefore exists for a system and method for tailoring of electronic messages wherein the above-mentioned disadvantages may be alleviated.

SUMMARY OF THE INVENTION

A first aspect of the present invention includes a system for tailoring of electronic messages. The system includes means for combining, in an electronic message, information with an indication that at least one portion of the information should be targeted for at least one predetermined class of recipient, and for producing a composite message; and means for performing a comparison of the indication contained in a received composite message with a predetermined indication of whether a recipient is of a class that should receive the indicated portion and for passing the indicated portion to the recipient in dependence on the comparison.

A second aspect of the present invention includes a method for tailoring of electronic messages. The method includes the steps of combining, in an electronic message, information with an indication that at least one portion of the information should be targeted for at least one predetermined class of recipient, and for producing a composite message; and performing a comparison of the indication contained in a received composite message with a predetermined indication of whether a recipient is of a class that should receive the indicated portion and for passing the indicated portion to the recipient in dependence on the comparison.

A third aspect of the present invention includes a method for producing a tailored electronic message. The method includes the steps of combining, in an electronic message, information with an indication that at least one portion of the information should be targeted for at least one predetermined class of recipient, and for producing a composite message, whereby a comparison of the indication contained in a received composite message with a predetermined indication of whether a recipient is of a class that should receive the indicated portion may allow the indicated portion to be passed to the recipient in dependence on the comparison.

A fourth aspect of the present invention includes a method for processing a tailored electronic message. The method includes the steps of receiving a composite electronic message combining information with an indication that at least one portion of the information should be targeted for at least one predetermined class of recipient; and performing a comparison of the indication contained in the received composite message with a predetermined indication of whether a recipient is of a class that should receive the indicated portion; and passing the indicated portion to the recipient in dependence on the comparison.

A fifth aspect of the present invention includes a tailored electronic message formed from electronic message information combined with an indication that at least one portion of the electronic message information should be targeted for at least one predetermined class of recipient, whereby a comparison of the indication contained in a received composite message with a predetermined indication of whether a recipient is of a class that should receive the indicated portion may allow the indicated portion to be passed to the recipient in dependence on the comparison.

BRIEF DESCRIPTION OF THE DRAWINGS

A preferred embodiment of the invention will now be described in detail by way of example only with reference to the following drawings:

FIG. 2A and FIG. 2B show different views of the e-mail message of FIG. 1B by different recipients in the system;

FIG. 3 shows a block diagram of elements used in the system;

FIGS. 5A and 5B show flow charts illustrating alternative versions of the process used in an "Author's process" element of FIG. 3.

DETAILED DESCRIPTION

The present invention in a preferred form is based on identifying, in an electronic message sent to recipients, different portions of the message which are suitable for passing to (i.e, in the present context, viewing by) different classes of recipients. Individual recipients can pre-select (in user templates which are used for comparison when the e-mail is read) which class or classes of information they wish to be passed (i.e, in the present context, they wish to view). As viewed by a recipient, a message includes only the portion(s) resulting from positive comparison between the identification in the message and the pre-selected identification(s) in the recipient's user template.

The recipient may set up a template which may be considered a 'personal interest profile'. The profile is typically not divulged to anybody but is kept private and locally (e.g., at the same site as the user's mail account information). E-mail and newsletters using this profile will only show the part of the content meeting the criteria in the interest profile.

The author of a newsletter or e-mail only needs to produce one copy that can be received and read by people with different interest profiles. Recipients may change their profiles (for example, when moving to another role in the recipient's organisation). After this change has been done, all newsletters and e-mail (previous as well as future) will be tailored for viewing to show information meeting the criteria in the interest profile.

It will, of course, be understood that the actual mailing and document system must be able to operate with conditional hidden tags (e.g., text elements) which indicate different classifications of different portions of the document.

Figure 1A:
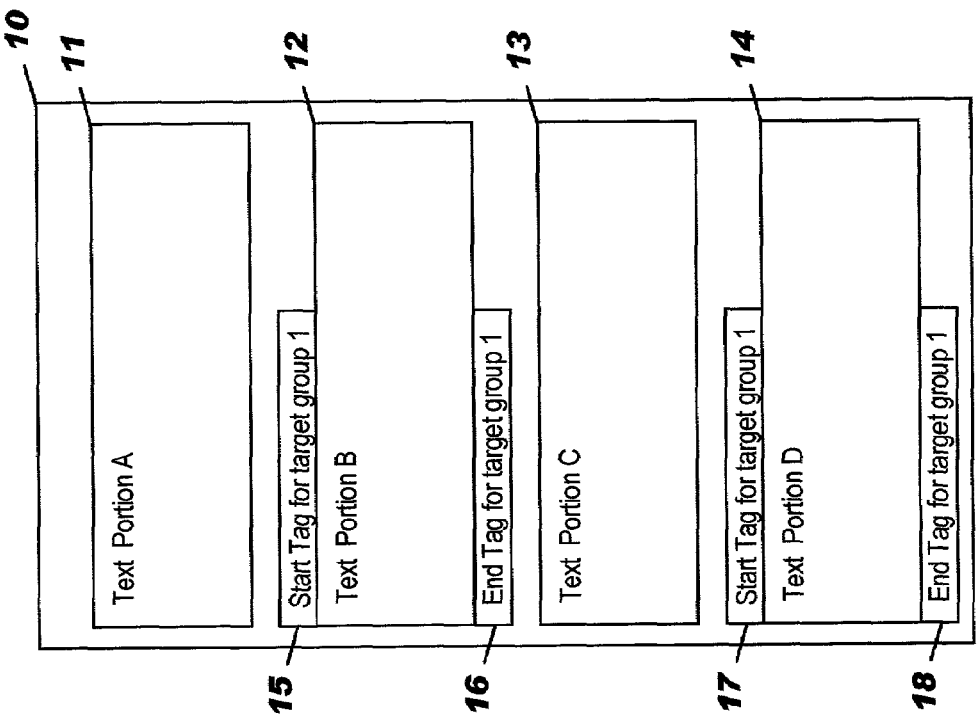
FIG. 1A and FIG. 1B show successive stages in composition by an author of an e-mail message for use in the system.
Figure 1B:
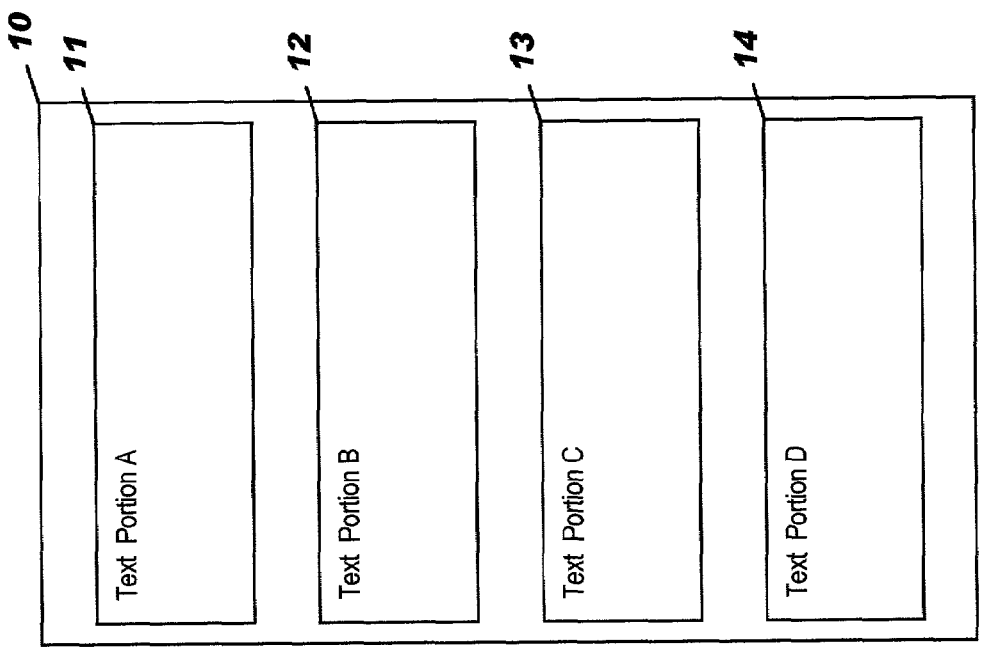

For an author, the precise way of operating will depend on the actual mailing/document system used. However, generally:

1) First, the author writes the whole document, e-mail, newsletter and so forth, including text to all target groups as desired (e.g., groups 1 to n). As shown in FIG. 1A the whole document 10 may have text portions A 11, B 12, C 13 and D 14.
2) Then, the author marks those text elements/paragraphs that should be visible only to a desired subset of the above target groups (e.g., group 1). As shown in FIG. 1B the text portions B 12 and D 14 may be marked by start and end tags 15 & 16 and 17 & 18. It will be appreciated that, dependent on the actual mailing/document system, the author might click a pre-tailored button/menu item named "Target group 1", which would then insert the appropriate formula or tag into the document text, or (after appropriate training) enter the appropriate tag or formula directly into the document text to hide the relevant portion of the document from groups other than the target group 1.
3) The author distributes/sends the actual document.

When a recipient (reader) views the e-mail of FIG. 1B, if the reader's personal interest profile indicates that she/he is intended to view 'group 1' information then the text portions B 12 and D 14 marked with the tags 15 & 16 and 17 & 18 respectively are displayed for the reader (along with the other text—portions A 11 and C 13—which is unrestricted). Thus such a recipient views the e-mail as shown in FIG. 2A.

However, if the reader's personal interest profile indicates that she/he is not intended to view 'group 1' information then the text portions B 12 and D 14 marked with the tags 15 & 16 and 17 & 18 respectively are not displayed for the reader (only the other text—portions A 11 and C 12—which is unrestricted). Thus such a recipient views the e-mail as shown in FIG. 2B.

To read a document prepared and sent by an author as above, potential readers should have received proper introduction to the 'tailoring' possibilities that may have been used by the author. Recipients should be aware of the possibility for them to tailor their individual reader's personal interest profile, for example by a pre-defined button/menu action named "Tailor your interest profile", or included as a paragraph in a newsletter or other distributed document/mail.

To maintain a reader's interest profile, the selections/deselections may be kept locally in a file (e.g., an 'ini' file) as a simple character string (e.g., 1 character per selection). Other possible representations for such a file (e.g., 1 bit per selection) will be apparent to a person of ordinary skill in the art.

Reading newsletters/documents/e-mail following this concept: after changing the interest profile, prior and future documents will for the reader be opened only showing the text elements/paragraphs/image or other portions that are intended for one of the reader's target groups (i.e., meeting one of the selected criteria in the reader's personal interest profile). A unique element of the invention is that profile changes have impact on all documents that follow this concept—whether prior to or after the reader's personal interest profile is set up or changed.

Referring firstly to FIG. 3, a preferred form of the system 100 of the present invention is described, which is based upon three major elements (processes):
- a central process 200 for maintenance and distribution of templates,
- an "author's process" 300 to support the author of a tailored document, and
- a "reader's process" 400 to support the recipient to read tailored documents and maintain a personal interest profile.

Figure 4:
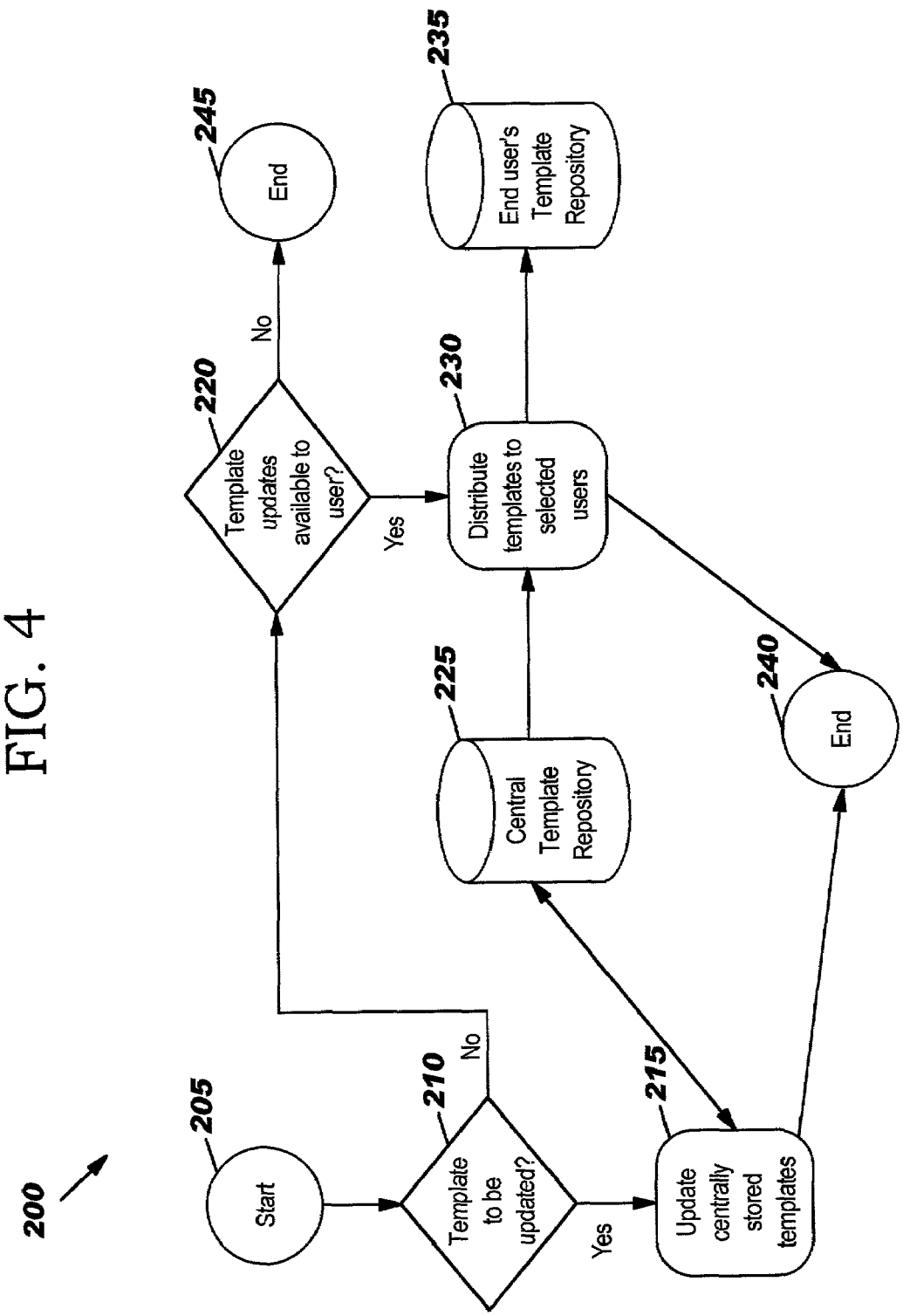
FIG. 4 shows a flow chart illustrating the process used in a "template maintenance and distribution" element of FIG. 3.

Referring now also to FIG. 4, the central process 200 for maintenance and distribution of templates is shown in the form of a flow chart.

In this central process 200, which conveniently may be centrally located remote from users of the system (e.g., at a remote server—not shown) maintenance and distribution of templates (which, as will be described in greater detail below, are used by authors and readers in the system) are performed.

As will be seen, after starting the central process 200 at step 205, a decision is made at step 210 whether any templates are to be updated: if yes, the process continues to step 215; if no, the process continues to step 220.

If at step 210 any templates are to be updated, this is performed at step 215 and the updated templates are stored in Central Template Repository 225. The process then ends at step 240.

If at step 210 no templates are to be updated, the process continues to step 220 where, (i) if template updates are to be made available to users, then the relevant templates are distributed to selected users at step 230 and stored in End-user's Template Repository 235, and the process then ends at step 240, or (ii) if template updates are not to be made available to users the process ends at step 245.

Figure 5A:
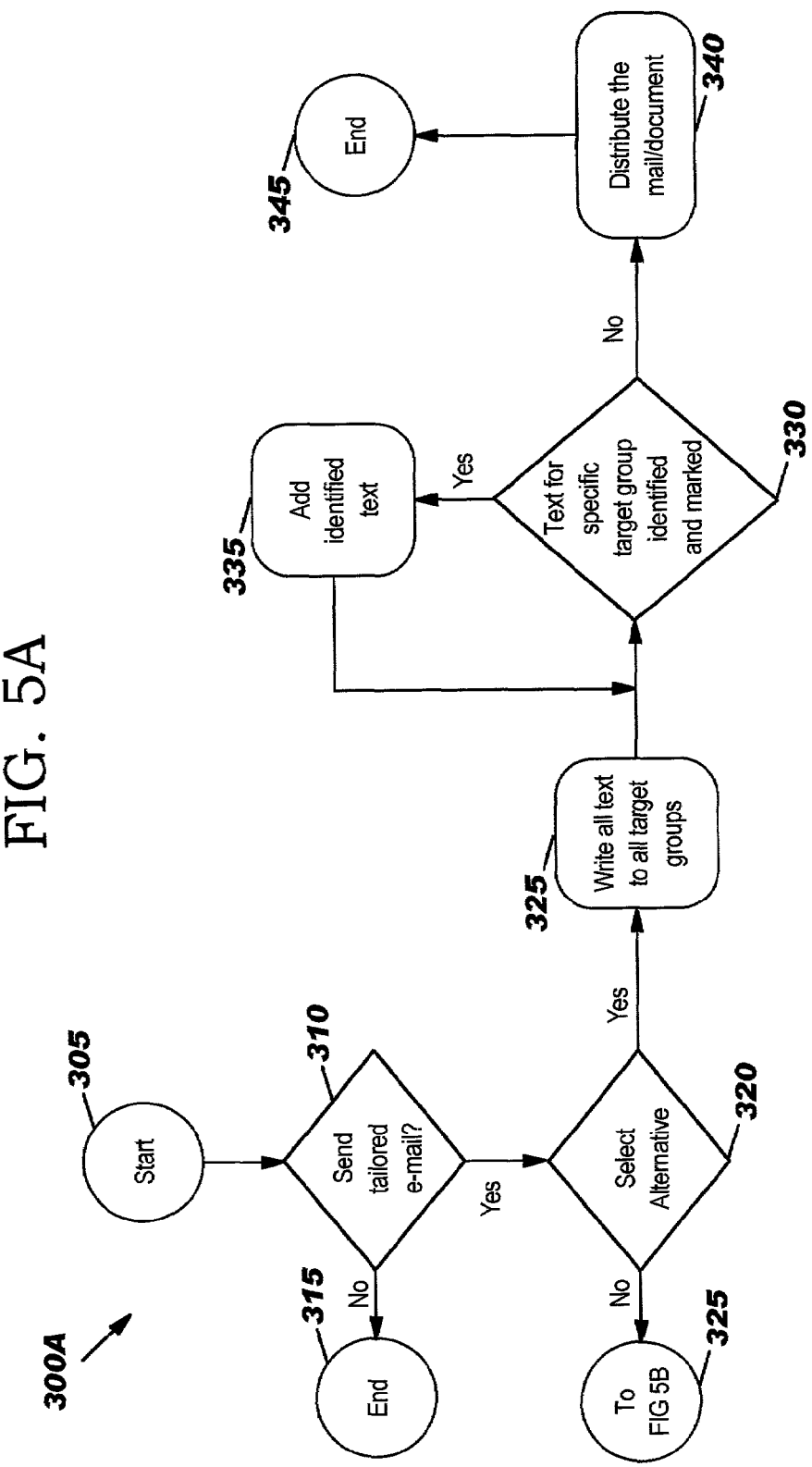

The "Author's Process" 300, to support the author of a tailored document, consists of two alternatives: 300A (as shown in FIG. 5A) or 300B (as shown in FIG. 5B).

Referring firstly to FIG. 5A, in the first alternative process to support the author of a tailored document, the process starts at step 305. The author decides at step 310 whether she/he wants to send a tailored e-mail and selects the appropriate program accordingly using for example a button, menu action item, and so forth, or by incorporation in all mail/document templates). If a tailored e-mail is not to be sent, the process ends at step 315. Otherwise the process continues to step 320.

At step 320 a decision is made as to whether the first alternative has been chosen: if so the process continues to step 325; otherwise the process jumps to the process 300B (which will be described in greater detail below).

At step 325 the author writes the whole document, mail, newsletter, and so forth, including text to all target groups 1-n. Then the author identifies and marks those text elements/paragraphs that should be visible only to a particular target group (e.g., group 1). The process then continues to step 330, where the author checks if any more elements should be similarly identified. If yes, then a further element is identified at step 335 and the process returns to the check at step 330; if no, then the process continues to step 340. At step 340, with all targeted portions identified and marked as necessary, the author distributes/sends the actual document, and the process ends at step 345.

Referring now to FIG. 5B, in the second alternative process 300B to support the author of a tailored document, the process starts at step 350. At step 355 a decision is made as to whether the second alternative has been chosen: if no, then the process ends at step 360; if yes, then the process continues to step 365. At step 365 the author writes into a pre-defined document template having different portions identified for viewing by different target groups. For example, the author enters into a pre-defined portion indicated as targeted at group 1 text which is intended for viewing by that group. At step 370, with all targeted text entered in relevant portions of the template and composition of the entire document completed, the author distributes/sends the actual document, and the process ends at step 375.

Figure 6:
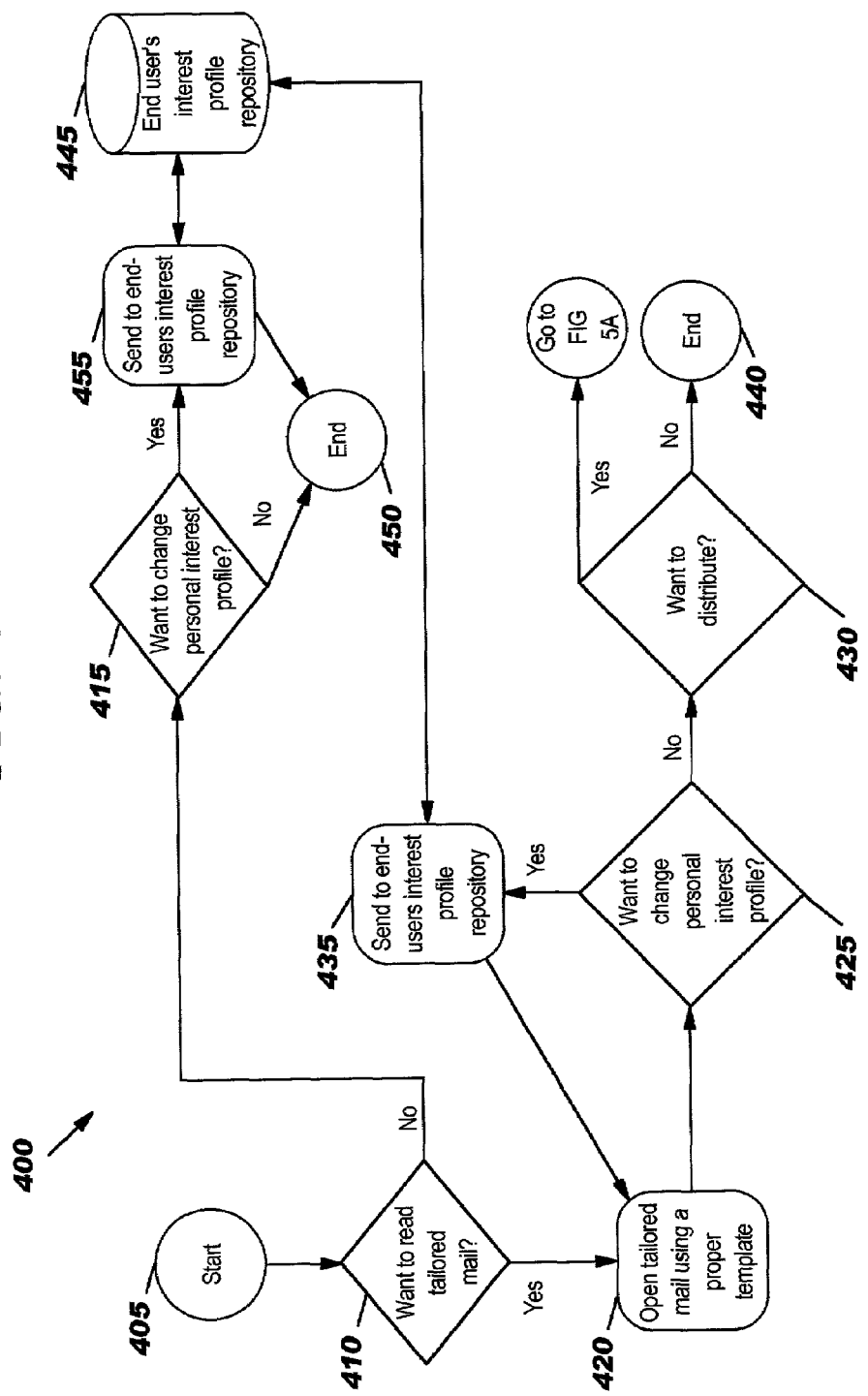
FIG. 6 shows a flow chart illustrating the process used in a "Reader's process" element of FIG. 3.

Referring now to FIG. 6, the "reader's process" 400 to support a recipient in reading tailored documents and maintaining a personal interest profile begins at step 405. At step 410 a check is made as to whether the reader wants to read a tailored e-mail: if no, then the process continues to step 415; if yes, then the process continues to step 420.

At step 420 the desired e-mail is displayed in tailored form to the reader, with only those portions being displayed for which criteria identified in the e-mail match those contained in the reader's personal interest profile. The template used for opening the e-mail may conveniently be selected automatically, although this is not a necessary condition of the invention—rather, this is a question of desired technical implementation.

The process then continues to step 425, at which a check is made as to whether the reader wants to change her/his personal interest profile: if no, then the process continues to step 430; if yes, then the process continues to step 435.

At step 430 a check is made as to whether the reader wants to distribute a tailored e-mail (now the reader may assume the role of an author—see process 300A/300B): if no, then the process ends at step 440; if yes, then the process jumps to the process 300A shown in FIG. 5A.

At step 435 the reader's changed personal interest profile is sent to the end users' interest profile repository 445, and the process jumps back to step 420 to return to open the tailored mail, now showing the content consistently with the updated interest profile.

At step 415 a check is made as to whether the reader wants to change her/his personal interest profile: if no, then the process ends at step 450; if yes, then the process continues to step 455. At step 455 the reader's changed personal interest profile is sent to the end users' interest profile repository 445, and the process then ends at step 450.

It will of course be appreciated that changes to the above described system will be apparent to a person of ordinary skill in the art once taught the present invention. For example, the portions of the electronic document that can be tailored for subsequently passing to the recipient may include not just text but may additionally or alternatively include graphic (static or video) images and/or audio segments. Also, a user's personal interest profile may be kept private to the user, or may be accessible for change only by an administrator (e.g., to be changed only on authority of an employee's personnel department when the employee's job role changes).

It will be appreciated that the system and methods described above will typically be performed by computer software program(s) which may be transferred on computer readable data carriers such as magnetic or optical disks (not shown).

It will be understood that the system and method for tailoring of electronic messages described above provides the following advantages:

The recipient may set up a 'personal interest profile', which is not divulged to anybody but is kept private and locally. E-mail and newsletters opened using this profile will only pass (i.e., show or play) the part(s) of the content meeting the criteria in the interest profile, resulting in that, unlike in other known solutions, a user will be able to decide exactly which parts of a document's content to view/play when a document is opened, independent of the age or status of the document.

The author of a newsletter or e-mail only needs to produce one copy or version of a message document that can be received and read by people with different interest profiles.

Recipients may change their profiles (for example when moving to another line in their organisation). After this change has been done, all newsletters and e-mail (both previously-received and those received in future) will be tailored dependent only on the interest profile used when opening the e-mail or newsletter.

I claim:

1. A method for tailoring of electronic messages to a multitude of recipients, said multitude of recipients being grouped in a plurality of classes of recipients, the method comprising the steps of:

combining in an electronic message information with an indication that at least one portion of the information is targeted for recipients of at least a predetermined one of said classes of recipient and producing a composite message; and performing a comparison of the indication contained in a received composite message with a predetermined indication of whether a specified one of the multitude of recipients is of a class intended to receive the targeted portion, wherein said predetermined indication is selected by the specified recipient to identify one or more of said plurality of classes to which the specified recipient belongs, and passing the targeted portion to the specified recipient in dependence on the comparison; wherein the performing step includes the steps of:

sending the received composite message to a client machine associated with the specified one of the recipients;

storing the received composite message on the client machine;

said specified recipient changing said predetermined indication to a new indication to change the one or more of the plurality of classes to which the specified recipient belongs; and after said changing step, performing a comparison of the indication contained in the received composite message with said new indication to determine whether the specified recipient has become of a class intended to receive the targeted portion.

2. The method for tailoring of electronic messages according to claim 1, wherein the indication in the message comprises a text tag.

3. The method for tailoring of electronic messages according to claim 1, wherein the predetermined indication comprises a text string of which at least one character indicates a desired class.

4. The method for tailoring of electronic messages according to claim 1, wherein at least one targeted portion of the electronic message comprises text.

5. The method for tailoring of electronic messages according to claim 1, further comprising providing to an author a message template containing the indication of at least one portion thereof and allowing the author to enter message information.

* * * * *